United States Patent
Bagnasco et al.

(10) Patent No.: US 6,587,633 B2
(45) Date of Patent: Jul. 1, 2003

(54) ACTIVE OPTICAL FIBRE DOPED WITH RARE EARTH ELEMENTS

(75) Inventors: Mara Bagnasco, Cossere (IT); Giorgio Bodei, Nuvolento (IT); Francesco Negrisolo, Sesto S. Giovanni (IT); Antonio Taglia, Piacenza (IT)

(73) Assignee: Corning OTI, Inc., Milan (IT)

( * ) Notice: Subject to any disclaimer, the term of this patent is extended or adjusted under 35 U.S.C. 154(b) by 0 days.

(21) Appl. No.: 09/822,155

(22) Filed: Mar. 30, 2001

(65) Prior Publication Data

US 2002/0114607 A1 Aug. 22, 2002

Related U.S. Application Data

(60) Provisional application No. 60/194,396, filed on Apr. 4, 2000.

(30) Foreign Application Priority Data

Mar. 30, 2000 (EP) .............................. 00201172

(51) Int. Cl.[7] .............................. G02B 6/00; G02B 6/02; C03B 37/023
(52) U.S. Cl. ..................... 385/142; 385/123; 385/126; 385/127; 65/385; 65/428
(58) Field of Search ................... 385/123–128, 385/142, 141, 144; 372/6; 359/134, 341; 65/385, 427, 428, 439, 111

(56) References Cited

U.S. PATENT DOCUMENTS

| 3,599,106 | A | | 8/1971 | Snitzer | 359/337 |
| 5,198,270 | A | | 3/1993 | Andrejco | 65/428 |
| 5,268,335 | A | * | 12/1993 | Kerko et al. | 501/66 |
| 5,500,764 | A | | 3/1996 | Armitage et al. | 359/341 |
| 5,798,306 | A | | 8/1998 | Dickinson, Jr. | 501/57 |
| 6,081,369 | A | * | 6/2000 | Waarts et al. | 359/341 |
| 6,128,430 | A | * | 10/2000 | Chu et al. | 385/142 |
| 6,268,303 | B1 | * | 7/2001 | Aitken et al. | 501/63 |

FOREIGN PATENT DOCUMENTS

| EP | 0673892 A | 9/1995 | C03C/3/097 |
| JP | 03235923 | 2/1990 | G02B/6/26 |
| WO | 9829351 A | 7/1998 | C03C/10/16 |
| WO | 0010932 A | 3/2000 | C03B/37/023 |

OTHER PUBLICATIONS

James Ainslie "A review of the fabrication and properties of erbium–doped fibers for optical amplifiers", Journal of Lightwave Technology, 1991, vol. 9, No. 2, pp. 220–227.

Hirotaka Ono "Gain–Flattened $Er^{3+}$–Doped Fiber Amplifier for a WDM Signal in the 1.57–1.60–$\mu$m Wavelengrh Region", IEEE Photonics Technology Letters, vol. 9, No. 5, May 1997, pp. 596–598.

H. Masuda et al. "Wideband, gain–flattened, erbium–doped fibre amplifiers with 3dB bandwidths of>50nm", Electronics Letters, vol. 33 No. 12, Jun. 1997, pp. 1070–1072.

* cited by examiner

*Primary Examiner*—Brian Healy
*Assistant Examiner*—Kevin S Wood
(74) *Attorney, Agent, or Firm*—Mary Y. Redman

(57) ABSTRACT

An active optical fiber (20) having:
  a silica glass cladding (4), and
  a glass core (2), doped with a rare earth, comprising a quantity of $SiO_2$ of at least 50% in weight, and a quantity of an oxide XO not exceeding 40% in weight,
  wherein the element X is selected from the group comprising Ca, Sr, Ba and Zn.

3 Claims, 1 Drawing Sheet

ACTIVE OPTICAL FIBRE DOPED WITH RARE EARTH ELEMENTS

This appln. claims benefit of Prov. No. 60/194,396 filed Apr. 4, 2000.

BACKGROUND OF THE INVENTION

1. Field of the Invention

The present invention relates to an active optical fibre doped with rare earth elements. Furthermore, the present invention relates to an optical amplifier comprising said active optical fibre, an optical communication system comprising said optical amplifier, and a method for producing said optical fibre.

2. Technical Background

As known, at present optical fibres are widely used in the field of telecommunications for transmitting signals. They essentially comprise an inner cylindrical region, called core, within which a signal is transmitted, and an outer annular region, called cladding. The refractive index of the cladding is lower than that of the core, so as to confine the transmitted signal within the latter.

Typically, both the core and the cladding are made of a silica-based glass material. The difference of refractive index between the core and the cladding is obtained by incorporating suitable additives (dopants) into the glass matrix of the core and/or of the cladding.

Typical examples of dopants used for modifying the refractive index of silica are germanium and phosphorous (which increase its refractive index) and fluorine (which decreases its refractive index).

An active optical fibre is an optical fibre whose core is further doped with particular substances capable of giving effects of optical amplification.

Typical examples of said substances are rare earth ions, whose spectroscopic properties are particularly suitable for the purpose. Among rare earths, erbium is the most frequently used component since its fluorescence spectrum has a band ranging between 1420 and 1650 nm, which corresponds to the third transmission window (centred at about 1550 nm) of a telecommunication signal.

Active optical fibres are used for producing optical amplifiers or, for example, super-fluorescent sources or lasers.

In general, an optical amplifier comprises an active optical fibre and a luminous source, called "pumping source", suitable to provide a pumping signal having a wavelength (typically corresponding to a peak of the absorption spectrum of the dopant substance) capable of bringing the ions of the dopant substance to an excited energetic level. From said level, the ions spontaneously fall—in very short times—to a laser-emission level, or metastable level, where they remain for a relatively longer time (called mean lifetime of the metastable level).

When a luminous signal having a wavelength corresponding to said metastable level passes through an active optical fibre having a high number of excited ions on the metastable level, the excited ions decade to a lower level, thus causing a stimulated luminous emission having the same wavelength as the signal.

High concentrations of rare earth ions inside the core of an active optical fibre reduce the length of fibre needed for obtaining a high amplification of the signal.

Nevertheless, due to the extremely compact structure of silica, inside the core of an active optical fibre the rare earth ions tend to aggregate with one another as their concentration inside the core increases (this phenomenon is conventionally known as "clustering").

Since—when aggregate—excited rare earth ions tend to fall from the metastable level in a non-radiative way, said aggregation causes a reduction of mean lifetime of the excited ions on the metastable level and thus, of the efficiency of fluorescence of the active optical fibre.

As the clustering prevents a corresponding increase of the fluorescence efficiency when the concentration of rare earth ions inside the core of an active fibre increases, it actually limits the value of maximum concentration of rare earth ions inside the core of an active optical fibre.

In the present invention and claims, the expression

"fluorescence efficiency" of a material indicates the ratio between the power of the amplified spontaneous emission (ASE) back-diffused by the material, in absence of transmission signal and during absorption of electromagnetic radiations by a pump source, and the power of the electromagnetic radiations received from said source (pumping power); and "amplification efficiency" of an optical amplifier indicates the ratio between the optical power of a transmission signal in output from it and the optical pumping power provided to it.

The amplification efficiency of an optical amplifier increases as the fluorescence efficiency of the rare earth with which the active optical fibre is doped increases.

B. James Ainslie ("A review of the fabrication and properties of erbium-doped fibers for optical amplifiers", Journal of Lightwave Technology, 1991, vol. 9, no. 2, pages 220–227) presents a review of methods of fabrication of active optical fibres doped with erbium and of the properties of said fibres. Among the other things, the Author states that the addition of $P_2O_5$ and $Al_2O_3$ to a silica-based glass enables the incorporation of several weight percents of rare earth ions without clustering effects. Furthermore, studies carried out on the concentration of erbium ions into $Al_2O_3$—$SiO_2$ and $GeO_2$—$SiO_2$ have shown that the weight percents of erbium ions that can be incorporated without clustering effects into silica- and alumina-based glasses ($Al_2O_3$—$Si_2$) is greater than the weight percents that can be incorporated into silica- and germanium-based glasses ($GeO_2$—$SiO_2$).

Nevertheless, the Applicant found that alumina has a limited solubility into the silica-based glass of conventional optical fibres (typically, the maximum quantity of alumina is less than or equal to, about 11%).

The Japanese patent application JP 3235923 describes an optical amplifier with an amplifying optical fibre suitable to amplify at the same time both signals in the band of 1300 nm and signals in the band of 1550 nm. Said amplifying optical fibre has both the core and the cladding made up of at least one glass material selected among a $CaO$—$Al_2O_3$—$SiO_2$ based glass, a phosphate-based glass and a fluorophosphate-based glass. Moreover, at least one between erbium and neodymium is included in at least one between the core and the cladding.

Nevertheless, the Applicant points out that said document does not give any further information on the composition of the $CaO$—$Al_2O_3$—$SiO_2$ based glass. In addition, as the active optical fibre it describes has both the core and the cladding made up of at least one glass material selected among a $CaO$—$Al_2O_3$—$SiO_2$ based glass, a phosphate-based glass and a fluorophosphate-based glass, it presents difficulties of junction with the optical fibres conventionally used for telecommunications, having a pure silica cladding.

For the production of an active optical fibre, the glasses of the core and cladding with different composition must be compatible with one another. For example, said glasses must be compatible in terms of temperature of glass transition.

This is an important requirement because during some steps of the production process of an optical fibre, the glass materials of core and cladding must both be at a plastic state (neither having a too high viscosity nor being at a melted state). This is only possible if the two materials have such temperatures of glass transition as to guarantee at least a partial superimposition of the temperature ranges in which they are at a plastic state.

SUMMARY OF THE INVENTION

The Applicant faced the technical problem of increasing the concentration of rare earth ions inside the core of an active optical fibre, limiting at the same time the ion-clustering phenomenon so as to obtain a corresponding increase in the fluorescence efficiency.

The Applicant has found that said problem can be solved with an active optical fibre having a silica glass cladding and a core comprising a quantity of silica ($SiO_2$) of at least 50% in weight, and a quantity of an oxide XO not exceeding 40% in weight, wherein X is selected from the group comprising Ca, Sr, Ba and Zn.

The Applicant has proved that the core of the active optical fibre comprising, according to the invention, the above percentages of $SiO_2$ and XO is compatible with the silica glass of the cladding in terms of temperature of glass transition (that is, the temperature range in which it is at the plastic state is at least partly superimposable to that of the cladding glass).

Moreover, among the above elements Ca, Sr, Ba and Zn, it has been proved that calcium is preferable since it has a greater solubility in the glass matrix of silica.

Thus, in a first aspect thereof, the present invention relates to an active optical fibre having:
- a silica glass cladding, and
- a glass core, doped with a rare earth, comprising a quantity of $SiO_2$ of at least 50% in weight, characterised in that the core also comprises a quantity of an oxide XO not exceeding 40% in weight, where X is selected from the group comprising Ca, Sr, Ba and Zn.

The Applicant has experimentally proved that the glass core of the active optical fibre of the present invention has a reduced clustering, thus advantageously allowing the increase of both the concentration of rare earth ions in the core, and the fluorescence efficiency obtainable with said concentration values.

Moreover, the Applicant has proved that the glass core of the active optical fibre according to the present invention —comprising a quantity of silica ($SiO_2$) of at least 50% in weight and a quantity of oxide XO not exceeding 40% in weight—has a greater refractive index than that of the cladding. It thus allows meeting the requirements for the transmission of an optical signal in an optical fibre.

Preferably, said element X is calcium. In fact, as already said above, it has been proved that it has a greater solubility in the glass matrix of the silica.

Preferably, the quantity of $SiO_2$ in the core is in the range from 60 to 90% in weight. More preferably, it is in the range from 70 to 90% in weight. Said values advantageously allow improving the compatibility in terms of temperature of glass transition between the glass of the core and that of the cladding.

Typically, the core also comprises a quantity of germanium dioxide ($GeO_2$) not exceeding 10% in weight.

According to a preferred embodiment, the core also comprises a quantity of alumina ($Al_2O_3$) not exceeding 25% in weight.

This preferred embodiment is advantageous because as alumina has a high crystalline field, it has the capacity of perturbing the orbital f of the rare earth, screened by the outer valence orbital, broadening and flattening the fluorescence spectrum of the rare earth.

This allows making the active optical fibre suitable to be used in WDM optical communication systems, since the flatter and broader the fluorescence spectrum of the rare earth, the greater the number of signals at different wavelength that can be evenly amplified.

In the present description and claims, the expression
* "crystalline field" is used to indicate the mean potential energy of interaction between two charged particles (for example, two ions). More in particular, the crystalline field J is expressed by the following relation (P. W. Atkins, "Molecular Quantum Mechanics", Oxford University Press, 1984, Second Edition, page 225):

$$J = \frac{e^2}{4\pi\varepsilon_0} \int |\Psi_{n1,l1,m1}(r_1)|^2 \left(\frac{1}{r_{1,2}}\right) |\Psi_{n2,l2,m2}(r_2)|^2 d\tau_1 \tau_2$$

wherein
"e" is the electric charge associated to an electron;
$\varepsilon_0$ is the dielectric constant in vacuum;
$\Psi(r)$ is the wave function of a charged particle;
$r_1$, $r_2$ are position vectors;
$r_{1,2}$ is the distance from the first charged particle to the second one;
$\tau_1$, $\tau_2$ are variables of integration in space;
and the expression
* "element at high crystalline field" is used to indicate an element having a crystalline field greater than about $0.8 \times 10^{-17}$.

The Applicant has proved that the glass core of the active optical fibre comprising, according to this preferred embodiment of the invention, a quantity of alumina not exceeding 25% in weight, is compatible with the silica glass of the cladding in terms of glass transition.

In the presence of alumina, the quantity of oxide XO is advantageously in the range from 20 to 60% in weight of the total weight of alumina. Preferably, it is in the range from 25 to 45% in weight of the total weight of alumina.

It has been proved that said quantities of oxide XO with respect to the total weight of alumina allow obtaining a good compromise between the phenomenon of broadening and flattening of the fluorescence spectrum of the rare earth due to alumina, and that of reduction of the clustering due to the oxide XO. In fact, too high quantities of XO can limit the broadening and the flattening of the fluorescence spectrum of the rare earth due to alumina, whereas too low quantities of XO can limit the reduction of clustering due to the oxide XO itself.

Moreover, it has been proved that said quantities of oxide XO allow the glass core of the optical fibre of the invention to be compatible with the silica glass of the cladding in terms of temperature of glass transition.

Advantageously, besides alumina, the core also comprises a predetermined quantity of a compound $YO_z$, where z is equal to 1 or 2, and Y is an element having a high crystalline field.

This is advantageous because the element Y with a high crystalline field has the capacity, like alumina, of interacting with the energy levels of the rare earth ions corresponding to the orbitals f, broadening and flattening the fluorescence spectrum of the rare earth.

Preferably, said quantity of said compound $YO_z$ does not exceed 7% in weight. Said quantity allows preserving the glass characteristics of the material of the core.

In this case, the quantity of oxide XO is advantageously in the range from 20 to 60% in weight of the total weight of alumina and of the compound $YO_z$. Preferably, the quantity of oxide XO is in the range from 25 to 45% in weight of the total weight of alumina and of the compound $YO_z$.

It has been proved that the above quantities of alumina, of said compound $YO_z$ and of the oxide XO allow the glass core of the optical fibre of the invention to be compatible with the silica glass of the cladding in terms of temperature of glass transition.

Typically, said compound $YO_z$ is selected from the group comprising $ZrO_2$, BeO and ZnO.

Advantageously, the core has a concentration of rare earth ions up to $10^{20}$ ions/cm$^3$.

The Applicant has found that, although the core of the active optical fibre according to the invention allows exceeding these values, greater concentrations of rare earth ions can be disadvantageous because as the mean distance between ions decreases, they can cause an undesired phononic relaxation (decay of the ions from the metastable level in a non-radiative way).

Advantageously, said rare earth in the glass of the core has a fluorescence efficiency of at least 50%. Preferably, said efficiency is of at least 54%.

Advantageously, said rare earth is erbium.

Preferably, said active optical fibre has a numerical aperture (NA) of at least 0.25. More preferably, said numerical aperture (NA) is of at least 0.27. High values of numerical aperture are advantageous since the fluorescence efficiency increases as the numerical aperture increases.

Advantageously, the silica glass cladding comprises a quantity of silica of at least 90%. Preferably, said quantity of silica is of at least 95%.

Moreover, in the proximity of the core-cladding interface, the active optical fibre advantageously comprises an annular layer of silica glass doped with a dopant that modifies its thermal expansion coefficient so as to make the thermal expansion coefficient of the cladding compatible with that of the core.

In fact, as the glasses of the core and of the cladding have a different composition, they also have different coefficients of thermal expansion. This may also bring to manufacture problems, as discussed in U.S. Pat. No. 4,339,173, which refers to fibres for transmitting luminous signals and describes the addition of $B_2O_3$ to the cladding of such fibre to reduce the differences in the coefficient of thermal expansion of the core and of the cladding, thus preventing the formation of cracks at the core-cladding interface of the preform during the cooling.

Moreover, as described in EP 0 602 467 filed by the same Applicant, the difference of the coefficients of thermal expansion causes stresses in correspondence with the core-cladding interface, and a background attenuation connected to said stresses.

Advantageously, said dopant that modifies the coefficient of thermal expansion of said annular layer is at least one among $P_2O_5$, $GeO_2$ and $B_2O_3$, present in a quantity that increases from the radially outer portion to the radially inner portion of said annular layer.

Moreover, since said dopant modifier of coefficient of thermal expansion of the annular layer can also modify its refractive index, said annular layer advantageously comprises also a dopant modifier of refractive index present in a quantity that increases from its radially outer portion to its radially inner portion.

This allows compensating the change of the refractive index caused by the dopant modifier of the coefficient of thermal expansion so that the refractive index of said annular layer is substantially constant for all of its thickness and substantially equal to, or less than, that of the cladding.

A typical example of this latter dopant modifier of refractive index is $F_2$, when the dopant modifier of the coefficient of thermal expansion raises the refractive index.

In a second aspect thereof, the present invention also relates to an optical amplifier for amplifying an optical signal having a signal wavelength $\lambda_s$, comprising an active optical fibre with a silica glass cladding and a glass core, doped with a rare earth, comprising a quantity of $SiO_2$ of at least 50% in weight;

a pumping source for providing a pumping light at a predetermined pumping wavelength $\lambda_p$;

an optical coupler for coupling said optical signal to be amplified and said pumping light into said active optical fibre;

characterised in that the core also comprises a quantity of an oxide XO not exceeding 40% in weight, where X is selected from the group comprising Ca, Sr, Ba and Zn.

Preferably, said rare earth is erbium.

Advantageously, said pumping wavelength $\lambda_p$ is equal to about 980 nm or 1480 nm.

In a preferred embodiment, said optical amplifier has an amplification band comprised between 1520 and 1630. Preferably, said band is comprised between 1570 and 1620 nm.

Optical amplifiers with an amplification band around about 1570–1600 nm are, for example, described by Hirotaka Ono et al. ("Gain-Flattened Er$^{3+}$ doped fiber amplifier for a WDM signal in the 1.57–1.60 μm wavelength region", IEEE Photonics Technology Letters, vol. 9, no. 5, May 1997, pages 596–598); H. Masuda et al. ("Wideband, gain-flattened, erbium-doped fibre amplifiers with 3 dB bandwidths of >50 nm", Electronics Letters, vol. 33, no. 12, June 1997, pages 1070–1072) and in the U.S. Pat. No. 5,500,764.

As regards the functional and structural characteristics of said active optical fibre, reference shall be made to what described above relating to the first aspect of the invention.

In a third aspect thereof, the present invention relates to an optical communication system comprising a transmitting station suitable to provide an optical signal having a signal wavelength $\lambda_s$;

an optical transmission line optically connected to said transmitting station, for transmitting said optical signal;

a receiving station optically connected to said optical transmission line for receiving said optical signal;

at least one optical amplifier for amplifying said optical signal, in turn comprising an active optical fibre with a silica glass cladding and a glass core, doped with a rare earth, comprising a quantity of $SiO_2$ of at least 50% in weight;

a pumping source for providing a pumping light at a predetermined pumping wavelength $\lambda_p$;

an optical coupler for coupling said optical signal and said pumping light into said active optical fibre;

characterised in that the core also comprises a quantity of an oxide XO not exceeding 40% in weight, where X is selected from the group comprising Ca, Sr, Ba and Zn.

As regards the functional and structural characteristics of said active optical fibre and of said optical amplifier, reference shall be made to what described above relating to the first and to the second aspect of the invention.

Advantageously, said optical signal is a WDM optical signal comprising a plurality of N signals having wavelengths $\lambda 1, \lambda 2, \ldots, \lambda N$.

In a fourth aspect thereof, the present invention also relates to a method for producing an active optical fibre, having a core and a cladding, comprising the steps of a) arranging a tubular support of silica glass;
b) laying inside said tubular support a glass powder comprising a quantity of $SiO_2$ of at least 50% in weight;
c) immersing the glass powder in a solution comprising a solvent and a salt of a rare earth;
d) making the solvent evaporate;
e) heating the tubular support so as to sinter the glass powder;
f) making the tubular support collapse so as to obtain a preform;
g) drawing said preform so as to obtain the active optical fibre;

characterised in that at step c), said solution also comprises a salt of an element $X^{2+}$, where X is selected from the group comprising Ca, Sr, Ba and Zn, in such quantity as to obtain a quantity of an oxide XO not exceeding 40% in weight in the core of the active optical fibre.

Typical examples of rare earth salts are, in the case of erbium, $ErCl_3$ and $ErI_3$.

Preferably, said element X is calcium.

Typical examples of salts of $X^{2+}$ are, in the case of calcium, $CaCO_3$, $CaCl_2$ and $Ca(NO_3)_2$.

Typical examples of solvent for step c) are methanol and water.

Advantageously, in step c) said solution also comprises a salt of $Al^{3+}$ in such quantity as to obtain a quantity of $Al_2O_3$ not exceeding 25% in weight in the core of the active optical fibre.

Typical examples of salts of $Al^{3+}$ are $AlCl_3$ and $Al(NO_3)_3$.

In this case, in the solution of said step c) the quantity of the salt of the element $X^{2+}$ is advantageously such as to obtain a quantity of the oxide XO in the range from 20 to 60% in weight of the total weight of $Al_2O_3$ in the core of the active optical fibre. Preferably, the quantity of the salt of the element $X^{2-}$ is such as to obtain a quantity of the oxide XO in the range from 25 to 45% in weight of the total weight of $Al_2O_3$ in the core of the active optical fibre.

Advantageously, at step c), besides the salt of $Al^{3+}$, said solution also comprises a salt of another element Y at a high crystalline field.

In this case, in the solution of said step c) the quantity of the salt of the element $X^{2+}$ is advantageously such as to obtain a quantity of the oxide XO in the range from 20 to 60% in weight of the total weight of $Al_2O_3$ and of a compound $YO_z$ (with z equal to 1 or 2) in the core of the active optical fibre.

Preferably, in the solution of step c), the quantity of salt of said element Y at high crystalline field is such as to obtain a quantity of said compound $YO_z$ not exceeding 7% in weight in the core of the active optical fibre.

Typically, said compound $YO_z$ is selected from the group comprising $ZrO_2$, BeO and ZnO.

Typically, in step b) said glass powder also comprises a quantity of $GeO_2$ not exceeding 10% in weight.

Optionally, between step a) and step b), the method of the invention also comprises the step of laying a number of glass layers—solidified starting from the reactants $SiCl_4$, $POCl_3$, $SF_6$ and/or $GeCl_4$ in vapour phase—into the tubular support in order to form an annular layer at the core-cladding interface suitable to make the core and the cladding compatible in terms of coefficient of thermal expansion.

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION OF THE PREFERRED EMBODIMENTS

Figure 1:
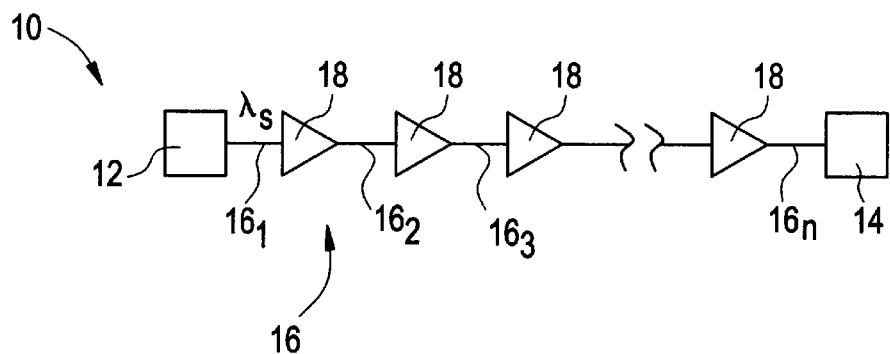
FIG. 1 shows a block diagram of a telecommunication system according to the invention.

FIG. 1 shows a telecommunication system 10 comprising a transmitting station 12 for providing a signal at a wavelength of signal $\lambda_s$, a receiving station 14 for receiving said signal, and an optical fibre transmission line 16 for transmitting the signal from the transmitting station 12 to the receiving station 14.

According to a preferred embodiment, the telecommunication system 10 is a WDM system.

In this case, the transmitting station 12 is a conventional WDM apparatus suitable to provide N optical signals having wavelengths $\lambda 1, \lambda 2, \ldots, \lambda N$ differing from one another, to wavelength multiplex them and send them into the optical transmission line 16. Moreover, said transmitting station 12 also comprises a booster optical amplifier (not shown) for amplifying the WDM optical signal before sending it along line 16 (or a number of booster optical amplifiers in parallel for amplifying optical signals comprised in different wavelength bands).

Said wavelengths $\lambda 1, \lambda 2, \ldots, \lambda N$ are typically selected in a range of wavelengths comprised between 1520 nm and 1630 nm.

For example, the telecommunication system 10 can be a WDM system at 128 channels spaced from one another by 50 GHz and divided in three bands: 16 channels between 1529 and 1535 nm (first band); 48 channels between 1541 and 1561 nm (second band) and 64 channels between 1575 and 1602 nm (third band).

Said receiving station comprises a conventional apparatus suitable to demultiplex said N optical signals and send them to possible subsequent processing stages. Moreover, said receiving station 14 typically comprises also an optical pre-amplifier (not shown) suitable to bring the WDM optical signal to a power level suitable to be received by the receiving apparatuses (or a number of optical pre-amplifiers in parallel for amplifying the optical signals comprised in different wavelength bands).

Line 16 comprises a plurality of optical amplification units 18 each comprising an optical amplifier for amplifying a signal coming from an upstream portion of line 16, wherein the signal has attenuated during its propagation along it, and sending it to a downstream portion of line 16.

Each unit 18 can also comprise a number of optical amplifiers arranged in parallel for amplifying the optical signals comprised in different wavelength bands (for example, the above-mentioned first, second and third band).

For example, system 10 can be a submarine telecommunication system wherein line 16 comprises optical cables $16_1$, $16_2$, $16_3$, ..., $16_n$ that respectively connect the transmitting station 12 to the first amplifier 18, said amplifier to the next one, and the last amplifier to the receiving station 14.

Each optical cable $16_1$, $16_2$, ..., $16_n$ comprises at least one optical fibre, and its length can vary from some dozens kilometres to some hundreds kilometres.

Said optical fibres preferably are single-mode at the N transmission wavelengths λ1, λ2, ..., λN, and typically have a pure silica cladding (about 100% silica). Moreover, they are, for example, of the step-index type.

Figure 2:
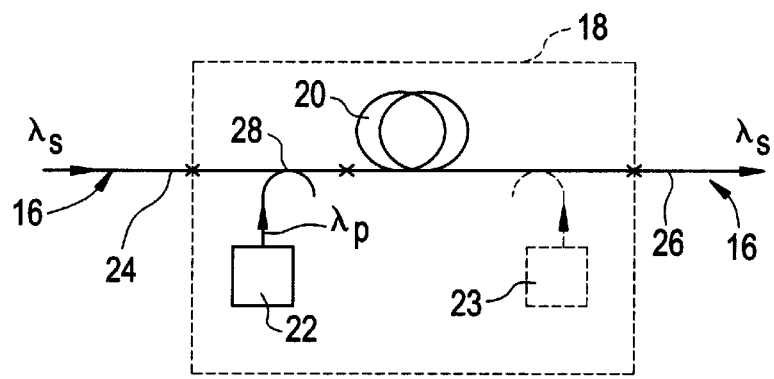
FIG. 2 shows a block diagram of an amplifier of the telecommunication system of FIG. 1.

As shown in FIG. 2, each booster optical amplifier of the transmitting station 12, pre-amplifier of the receiving station 14 and optical amplifiers of the amplification units 18 comprises an erbium-doped active optical fibre portion 20 and a pumping laser 22 for pumping fibre 20 at a pumping wavelength $\lambda_p$. Pump 22 is coupled to an input end of the active optical fibre 20 and to an optical fibre 24 (comprised in the optical cable arranged upstream of the optical amplifier) by a wavelength selective coupler 28 (for example, a fused-fibre coupler) so that the signal and pumping light propagate together through fibre 20. Moreover, the output end of the active optical fibre 20 is jointed to an optical fibre 26 comprised in the optical cable arranged downstream of the optical amplifier.

Nevertheless, according to the system requirements, the pumping laser 22 can also be coupled between the output end of the active fibre 20 and the optical fibre 26 (as shown with dashed lines with reference numeral 23) so that the signal and pumping light propagate in opposed directions through fibre 20.

Alternatively, each end of fibre 20 can be coupled to a respective pumping laser.

In the embodiment shown, the wavelength $\lambda_p$ of the pump is equal to about 980 nm.

Each optical amplifier of those described can optionally comprise more than one stage of optical amplification of which at least one can comprise an active optical fibre according to the invention.

Figure 3:
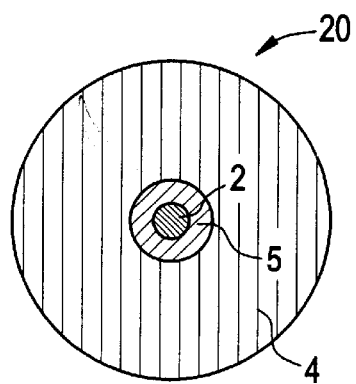
FIG. 3 is a transverse section of an active optical fibre of the amplifier of FIG. 2.

As shown in FIG. 3, the active optical fibre 20 has a core 2 and a cladding 4. The cladding is of $SiO_2$ glass, while core 2 is doped with a rare earth and comprises, according to the invention, a quantity of $SiO_2$ of at least 50% in weight, and a quantity of an oxide XO not exceeding 40% in weight, where X is selected from the group comprising Ca, Sr, Ba and Zn.

Core 2 with the above composition has resulted compatible with the silica glass of the cladding in terms of temperature of glass transition, and it has a reduced clustering, thus advantageously allowing the increase of both the concentration of rare earth ions in the core, and the fluorescence efficiency obtainable with said concentration values.

It has been proved that said percentages of $SiO_2$ and of XO allow obtaining a good compromise between two contrasting phenomena: the compatibility between the glasses of core 2 and of cladding 4 in terms of temperature of glass transition, and the reduction of clustering. In fact, high quantities of $SiO_2$ correspond to a better core-cladding compatibility, and high quantities of XO correspond to a better reduction of clustering.

Advantageously, core 2 also comprises a quantity of alumina ($Al_2O_3$) not exceeding 25% in weight so as to make (as already said above) the active optical fibre 20 suitable to be used in WDM optical communication systems.

In the presence of alumina, the quantity of CaO is advantageously in the range from 20 to 60% in weight of the total weight of alumina. Preferably, it is in the range from 25 to 45% in weight of the total weight of alumina.

It has been proved that said quantities of CaO and $Al_2O_3$ allow the glass core of the optical fibre of the invention to be compatible with the silica glass of the cladding in terms of temperature of glass transition.

Moreover, it has been proved that said quantity of CaO with respect to the quantity of $Al_2O_3$ allows the alumina to effectively broaden and flatten the fluorescence spectrum of the rare earth, and the CaO to effectively reduce the clustering.

For example, core 2 has the following composition in weight:

about 88.2% $SiO_2$,
about 2.3% $GeO_2$,
about 3.6% CaO,
about 5.9% $Al_2O_3$,
about 980 ppm $Er_2O_3$ and the cladding is of pure silica (about 100% $SiO_2$).

The silica cladding 4 facilitates the junction between the active optical fibre 20 of the invention with the optical fibres conventionally used for the optical transmission line 16, which have a silica cladding as well. In fact, thanks to it, the active optical fibre 20 is advantageously weldable by fusion (that is, through a low attenuation junction) with the conventional transmission optical fibres.

Of course, rather than in all optical amplifiers of the telecommunication system 10 (boosters, pre-amplifiers and amplifiers of the amplification units 18), the active optical fibre 20 according to the invention can be used only in one or in some of the above amplifiers.

Optionally, the active optical fiber 20 may comprise, at the interface core-cladding, an annular layer 5 doped preferably with $P_2O_5$, $GeO_2$ and $F_2$.

More in particular, the annular layer 5 contains a quantity of $P_2O_5$ and $GeO_2$ which increases from its radially outer portion to its radially inner portion.

In fact, since core 2 has a greater coefficient of thermal expansion with respect to that of the cladding, and since $P_2O_5$ and $GeO_2$ are dopants that raise the coefficient of thermal expansion, said type of doping allows obtaining a connection portion between the coefficient of thermal expansion of core 2 and of cladding 4 and a compatibility, during the production step of the optical fibre, between the coefficient of thermal expansion of cladding 4 and that of core 2.

Nevertheless, besides raising the coefficient of thermal expansion, $P_2O_5$ and $GeO_2$ also raise the refractive index.

Consequently, to compensate the effect of increase of the refractive index of $P_2O_5$ and $GeO_2$, the annular layer 5 is also doped with $F_2$ (which has the property of lowering the refractive index) with a quantity that increases from the radially outer portion of layer 5 to the radially inner portion, with a consequent effect on the refractive index. In this way, the refractive index of the annular layer 5 is substantially constant for its entire extension, and it is substantially equal to or less than, the refractive index of cladding 4, that is, to the refractive index of pure silica.

The active optical fibre 20 can be advantageously realised with the already-mentioned MCVD and solution-doping techniques, well known in the prior art.

For example, according to the MCVD technique, the active optical fibre 20 is obtained starting from a pure silica tube.

For the purpose of forming the annular layer 5, inside said silica tube there are laid layers of glass solidified starting from reactants such as, for example, $SiCl_4$, $POCl_3$, $GeCl_4$ and $SF_6$ in vapour phase.

Then, a layer of glass powder (non-solidified glass) comprising a quantity of $SiO_2$ of at least 50% and of $GeO_2$ not exceeding 10% is laid into the tube to form the core.

Afterwards, according to the solution-doping technique, the glass powder layer of $SiO_2$—$GeO_2$ is soaked in a solution comprising salts of $Al^{3+}$, $Er^{3+}$ and $Ca^{2+}$.

For example, said solution is composed of methanol (solvent): about 150 cc

HCl 36%: about 20 cc $AlCl_3$ 6 $H_2O$: about 55 gr $CaCO_3$: about 10 gr $ErCl_3$: about 0.4 gr The solvent is then made to evaporate through exposition to air for some hours, and the tube is heated at a temperature at which both the material of the core and that of the cladding are at a plastic state so as to sinter the glass powders.

At this point, the tube is made to collapse so as to obtain a preform that is then drawn to obtain the optical fibre.

For the purpose of comparing the performances of the active optical fibre 20 according to the invention to those of a conventional active optical fibre, the Applicant has carried out some experimental measures on the active optical fibre 20 of the invention, having the composition indicated above, and on a conventional active optical fibre having a very high quantity of alumina (about 11%) and a relatively low concentration of erbium ions (that is to say, having an optimum composition in terms of clustering and of fluorescence efficiency). The core of said conventional fibre has the following composition in weight:

about 88% of $SiO_2$, about 1% of $GeO_2$, about 11% of $Al_2O_3$, about 740 ppm of $Er_2O_3$, and a pure silica cladding (about 100% of $SiO_2$).

Table 1 shows the results obtained with the above experimental measures.

TABLE 1

| TYPE OF FIBRE | CONVENTIONAL | INVENTION |
| --- | --- | --- |
| Fluorescence Eff. | 50% | 54% |
| Mean lifetime | 9.8 msec | 10.2 msec |
| $Er^{3+}/cm^3$ | $9*10^{18}$ | $12.3*10^{18}$ |
| NA | 0.25 | 0.28 |
| $Er^{3+}$ Absorption | 7.4 dB/m | 10.5 dB/m |

The measure of fluorescence efficiency has been carried out in a conventional way, by pumping with a pumping source an active optical fibre having a virtually infinite length (that is to say, suitable to completely absorb the pump power). The fluorescence efficiency has been determined, each time, as the ratio between the amplified spontaneous emission (ASE) back-scattered by the active optical fibre 20—measured at the input of the active optical fibre 20—and the optical pumping power provided at the input of the active optical fibre 20, from the input to the output. The pumping source emitted at about 977 nm, and the pumping power was made to vary between 20 and 80 mW about.

The measure of the mean lifetime has been carried out in a conventional way, by pumping with a pumping source a very short portion (few cm) of active optical fibre so as to obtain a complete population inversion of the metastable level with respect to the lower energetic level, switching off the pumping source when the population inversion was obtained and measuring with an oscilloscope, at the output of said portion of fibre, the decay time of the fluorescence signal with the pumping source off.

The concentration of erbium ions has been determined with the known SEM (Scanning Electron Microscope) device.

The numerical aperture has been determined with the known device P 104 produced by the firm YORK (UK).

The absorption of erbium ions, that is to say, the absorption of a luminous radiation at about 1550 nm that passes through the active optical fibre in absence of pumping, has been determined with a conventional technique of spectrophotometry in absorption.

As it can be noted in Table 1, although the active optical fibre 20 of the invention has a smaller quantity of alumina in weight (about 5,9%) than that of the conventional fibre (about 11%), and a greater concentration of erbium ions (about $12.3*10^{18}$ with respect to about $9*10^{18}$), it has a fluorescence efficiency and a mean lifetime τ in the metastable level that are greater than those of the conventional fibre (54% and 10.2 msec respectively compared to 50% and 9.8 msec respectively).

This is due to the fact that the core of the active optical fibre 20 of the invention has a reduced clustering, thus allowing making optical amplifiers with higher concentrations of erbium ions and fluorescence efficiency.

To this purpose, it is also worth noting that, for optimising the pumping efficiency of an optical amplifier, the length of the active optical fibre must be such as to allow a substantially complete absorption of the pumping power. Thus, an increase of the concentration of erbium ions allows absorbing the pumping power along a shorter portion of active fibre, and making optical amplifiers with active optical fibres of reduced length with respect to those of the conventional optical amplifiers.

For example, comparing the absorption values of erbium of Table 1, it is evident that the active optical fibre 20 of the invention used in the experimental measures allows reducing the total length of fibre needed for any single amplification stage by about 30%.

This is advantageous, for example, in WDM telecommunication systems, wherein the pumping power needed for amplifying a plurality of optical signals is more than that needed for amplifying a single signal.

Further on, a reduced length of the active optical fibre is even more advantageous in the case of optical amplifiers with an amplification band at about 1570–1620 nm, which intrinsically need, for their operation, active optical fibres with a high total quantity of erbium.

From the results shown in table 1, it can also be noted that the active optical fibre 20 of the invention has a greater numerical aperture (NA) with respect to that of the conventional optical fibre (0.28 compared to 0.25).

This is an advantageous aspect of the invention since, besides increasing as the clustering is reduced, the fluorescence and the amplification efficiency also increase as the numerical aperture increases.

What is claimed is:

1. A method for producing an active optical fibre (20), having a core (2) and a cladding (4), comprising the steps of a) arranging a tubular support of silica glass;

b) laying inside said tubular support a glass powder comprising a quantity of $SiO_2$ of at least 50% in weight;

c) immersing the glass powder in a solution comprising a solvent and a salt of a rare earth element;

d) making the solvent evaporate;

e) heating the tubular support so as to sinter the glass powder;

f) making the tubular support collapse so as to obtain a preform;

g) drawing said preform so as to obtain the active optical fibre (20) characterised in that at step c), said solution also comprises a salt of an element $X^{2+}$, wherein X is selected from the group comprising Ca, Sr, Ba and Zn, in such quantity as to obtain a quantity of an oxide XO not exceeding 40% in weight in the core (2) of the active optical fibre (20).

2. A method according to claim 1, wherein in step c) said solution also comprises a salt of $Al^{3+}$ in such quantity as to obtain a quantity of $Al_2O_3$ not exceeding 25% in weight in the core (2) of the active optical fibre (20).

3. A method according to claim 2, wherein, in the solution of said step c), the quantity of salt of the element $X^{2+}$ is such to obtain in the core (2) of the active optical fibre (20) a quantity of oxide XO in the range from 20 and 60% in weight of the total weight of $Al_2O_3$.

* * * * *